(12) United States Patent
Dubin et al.

(10) Patent No.: US 9,182,252 B2
(45) Date of Patent: Nov. 10, 2015

(54) PROBE FOR DETERMINING AN ABSOLUTE POSITION OF A ROD OF A CYLINDER

(75) Inventors: Matthew Brian Dubin, Tucson, AZ (US); Robert Joseph Pagano, Tucson, AZ (US); James Cirillo, Cleveland Hts., OH (US)

(73) Assignee: Parker Hannifin Corporation, Cleveland, OH (US)

( * ) Notice: Subject to any disclaimer, the term of this patent is extended or adjusted under 35 U.S.C. 154(b) by 1147 days.

(21) Appl. No.: 12/990,987

(22) PCT Filed: May 14, 2009

(86) PCT No.: PCT/US2009/043967
§ 371 (c)(1),
(2), (4) Date: Nov. 4, 2010

(87) PCT Pub. No.: WO2009/140503
PCT Pub. Date: Nov. 19, 2009

(65) Prior Publication Data
US 2011/0058182 A1    Mar. 10, 2011

Related U.S. Application Data

(60) Provisional application No. 61/053,821, filed on May 16, 2008.

(51) Int. Cl.
  *G01B 11/14* (2006.01)
  *G01D 5/26* (2006.01)
  *G01D 11/24* (2006.01)

(52) U.S. Cl.
  CPC ............... *G01D 5/268* (2013.01); *G01B 11/14* (2013.01); *G01D 11/245* (2013.01)

(58) Field of Classification Search
  CPC ..... G01B 11/24; G01B 11/2433; G01B 11/26
  USPC .................................................. 356/601–615
  See application file for complete search history.

(56) References Cited

U.S. PATENT DOCUMENTS 447,785 A     3/1891  McBride
3,013,826 A  12/1961  Sharp
(Continued)

FOREIGN PATENT DOCUMENTS

EP   1 580 522 A1   9/2005
WO      00/28285   5/2000
(Continued)

OTHER PUBLICATIONS

Focus on Lasers, "Laser Marking for Fabricators", The Fabricator, May/Jun. 1990.
(Continued)

*Primary Examiner* — Gregory J Toatley
*Assistant Examiner* — Iyabo S Alli
(74) *Attorney, Agent, or Firm* — Renner, Otto, Boisselle and Sklar, LLP (57) ABSTRACT

A probe for determining an absolute position of a rod relative to a cylinder with the rod having an associated pattern for indicating position includes a light source for emitting light. The probe further includes a light pipe for directing light emitted by the light source onto the pattern of the rod. A detector of the probe detects light and provides a signal indicative of the detected light. A lens produces an image of a portion of the pattern illuminated by the light on the detector and a controller is responsive to the signal from the detector for determining an absolute position of the rod relative to the cylinder.

18 Claims, 8 Drawing Sheets

(56) References Cited

U.S. PATENT DOCUMENTS

| | | | |
|---|---|---|---|
| 3,284,088 A | 11/1966 | Pippert | |
| 3,718,821 A * | 2/1973 | Vischulis | 250/202 |
| 4,055,107 A | 10/1977 | Bartley | |
| 4,170,726 A | 10/1979 | Okuda | |
| 4,335,295 A | 6/1982 | Fowler | |
| 4,406,939 A | 9/1983 | Golker | |
| 4,533,815 A | 8/1985 | Ecer | |
| 4,547,649 A | 10/1985 | Butt et al. | |
| 4,701,615 A | 10/1987 | Schmitt | |
| 4,756,229 A | 7/1988 | Drakeley | |
| 4,758,705 A | 7/1988 | Hertzel et al. | |
| 4,765,063 A | 8/1988 | Sing | |
| 4,839,591 A | 6/1989 | Nomura et al. | |
| 4,899,048 A * | 2/1990 | Shelander | 250/231.14 |
| 4,901,073 A | 2/1990 | Kibrick | |
| 5,106,455 A | 4/1992 | Jacobsen et al. | |
| 5,149,963 A | 9/1992 | Hassler, Jr. | |
| 5,251,012 A | 10/1993 | Riegger et al. | |
| 5,455,509 A | 10/1995 | Semura et al. | |
| 5,568,760 A | 10/1996 | Volzer | |
| 5,642,793 A | 7/1997 | Ljosne | |
| 5,736,410 A | 4/1998 | Zarling et al. | |
| 5,825,017 A | 10/1998 | Pryor | |
| 5,871,391 A | 2/1999 | Pryor | |
| 6,179,830 B1 | 1/2001 | Kokubu | |
| 6,240,652 B1 | 6/2001 | Bobel et al. | |
| 6,312,914 B1 | 11/2001 | Kardos et al. | |
| 6,327,791 B1 | 12/2001 | Norcross et al. | |
| 6,362,888 B1 | 3/2002 | Jung et al. | |
| 6,366,726 B1 | 4/2002 | Wach et al. | |
| 6,373,573 B1 | 4/2002 | Jung et al. | |
| 6,452,158 B1 | 9/2002 | Whatley et al. | |
| 6,452,159 B2 | 9/2002 | Holzapfel et al. | |
| 6,487,349 B2 | 11/2002 | Wach et al. | |
| 6,519,037 B2 | 2/2003 | Jung et al. | |
| 6,533,596 B2 | 3/2003 | Demuth et al. | |
| 6,538,243 B1 * | 3/2003 | Bohn et al. | 250/216 |
| 6,614,534 B1 | 9/2003 | Marcus et al. | |
| 6,834,574 B2 | 12/2004 | Neumann | |
| 6,922,158 B2 * | 7/2005 | Ymker | 341/15 |
| 7,047,865 B2 * | 5/2006 | Neumann | 91/1 |
| 7,323,680 B2 | 1/2008 | Chong | |
| 7,336,988 B2 | 2/2008 | Schnitzer | |
| 7,552,671 B2 | 6/2009 | Neumann | |
| 7,570,433 B2 * | 8/2009 | Shimomura et al. | 359/663 |
| 2002/0141714 A1 | 10/2002 | Reed et al. | |
| 2004/0173738 A1 | 9/2004 | Mizuno | |
| 2004/0261283 A1 | 12/2004 | Falkinger et al. | |
| 2005/0151941 A1 | 7/2005 | Solomon | |
| 2005/0201715 A1 | 9/2005 | Ellwood, Jr. | |
| 2006/0091304 A1 | 5/2006 | Saint Clair | |
| 2006/0144217 A1 | 7/2006 | Neumann | |
| 2007/0206203 A1 | 9/2007 | Trainer | |
| 2008/0094631 A1 | 4/2008 | Jung et al. | |

FOREIGN PATENT DOCUMENTS

| | | |
|---|---|---|
| WO | 2006088938 A1 | 8/2006 |
| WO | 2008045851 A1 | 4/2008 |

OTHER PUBLICATIONS

Technology Review, "Position Transducers Provide System Feedback", Hydraulics & Pneumatics, Apr. 2000. n.

"Tool Maker Turns to Lase-Etching", Modern Machine Shop, Apr. 1990.

International Search Report and Written Opinion for corresponding patent application No. PCT/US09/43967 dated Oct. 21, 2009.

* cited by examiner

PROBE FOR DETERMINING AN ABSOLUTE POSITION OF A ROD OF A CYLINDER

CROSS REFERENCE TO RELATED APPLICATIONS

The present application claims the benefit of the filing date of U.S. Provisional Patent Application Ser. No. 61/053,821, filed May 16, 2008, the disclosure of which is incorporated herein by reference in its entirety.

TECHNICAL FIELD

The invention relates to a probe for use in determining an absolute position of a rod of a cylinder.

BACKGROUND

Sensors for absolute position sensing are known in the art. U.S. Pat. No. 7,047,865 discloses a known sensor in which light from a light source travels through a first fiber optic array and is projected onto a pattern for illuminating the pattern. Light reflected off of the pattern passes through a second fiber optic array to a detector for detecting the illuminated pattern.

Figure 10:
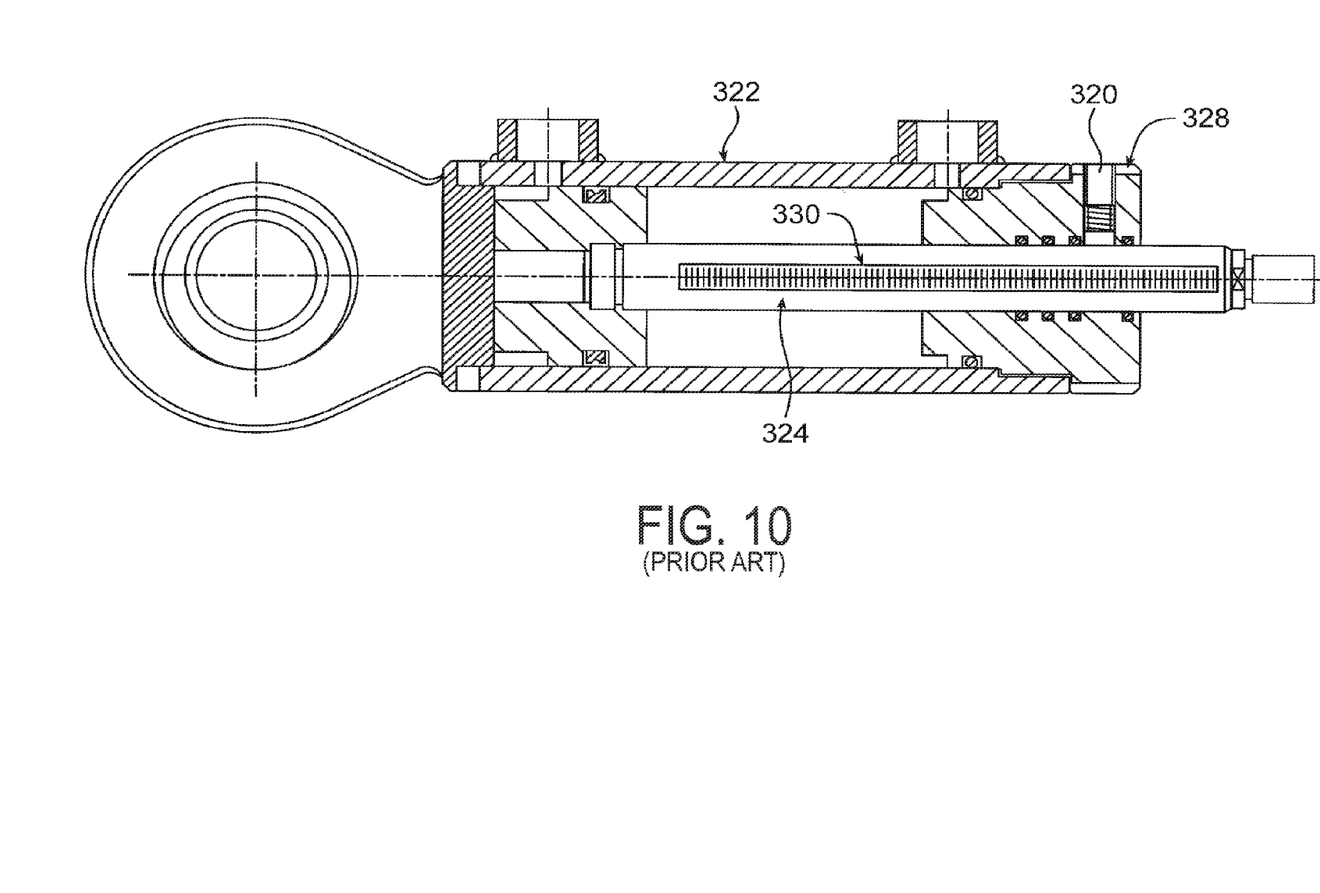
FIG. 10 illustrates a prior art cylinder having a sensor for sensing a position of a rod relative to a housing of the cylinder.

FIG. 10 illustrates an absolute position sensor 320 associated with a cylinder 322 for detecting a position of a rod 324 of a cylinder. The sensor 320 is affixed to a portion of a housing 328 of the cylinder 322. The rod 324 includes a predefined pattern 330, a portion of which is shown in FIG. 10, that extends under the sensor 320. The position of the rod 324 relative to the housing 328 is determined based upon the portion of the predefined pattern 330 detected by the sensor 320.

SUMMARY

A probe is provided for determining an absolute position of a rod relative to a cylinder. The rod has an associated pattern for indicating position. The probe includes a light source for emitting light. A light pipe directs light emitted by the light source onto the pattern of the rod. A detector detects light and provides a signal indicative of the detected light. A lens produces an image of a portion of the pattern illuminated by the light on the detector. A controller is responsive to the signal from the detector for determining an absolute position of the rod relative to the cylinder.

In an exemplary embodiment, the lens is a gradient index lens. The lens is formed from a plurality of rods arranged in an array. One exemplary array has multiple rows of rods supported in an outer sheathing.

The probe may include a housing that receives a cassette for supporting at least the light source, the detector, the light pipe and the lens and for establishing a focal distance between at least the detector and the lens. The cassette may be fixed relative to the housing or may be movable axially relative to the housing. When movable relative to the housing, a biasing member is provided for acting between the housing and the cassette.

BRIEF DESCRIPTION OF THE DRAWINGS

Embodiments of this invention will now be described in further detail with reference to the accompanying drawings, in which.

DETAILED DESCRIPTION

Figure 1:
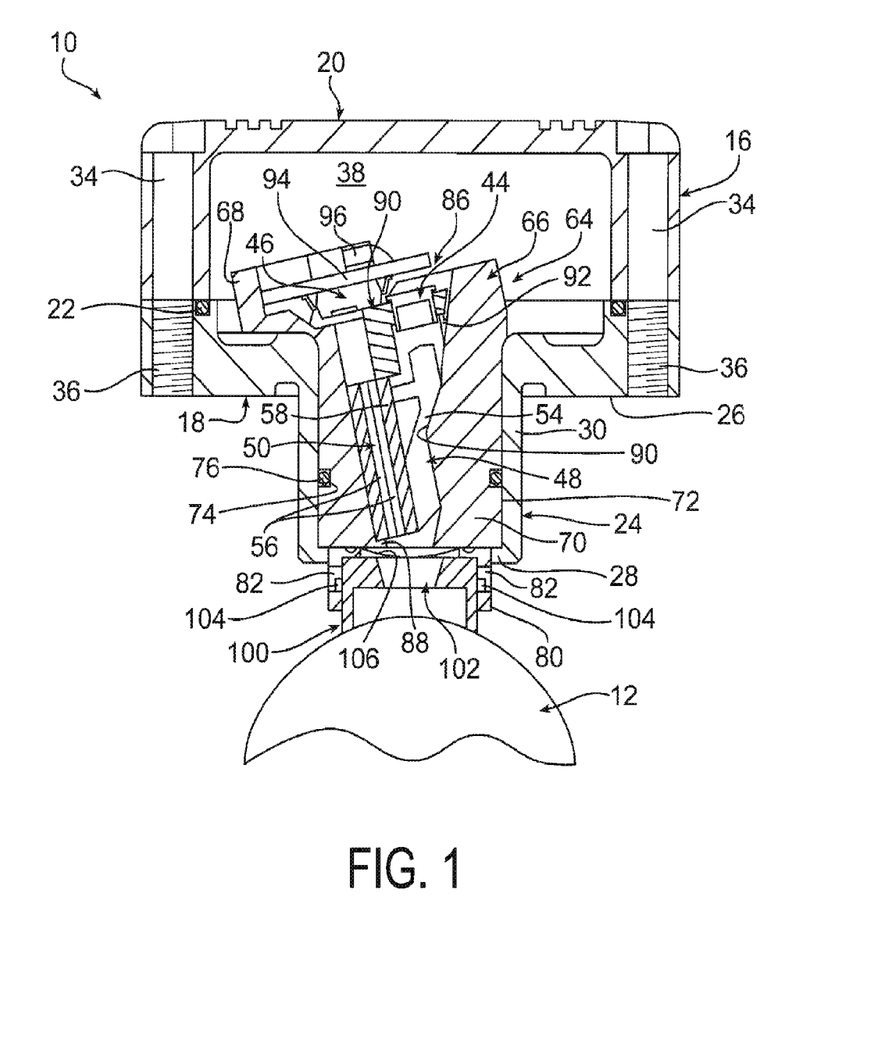
FIG. 1 illustrates a probe constructed in accordance with an exemplary embodiment of the invention positioned adjacent a rod of a cylinder.

FIG. 1 illustrates a probe 10 constructed in accordance with an exemplary embodiment of the invention. The probe 10 of FIG. 1 is illustrated in relation to a rod 12 of a cylinder. The rod 12 has a pattern (not shown in FIG. 1) for use in absolute position sensing. An example of such a pattern is illustrated with reference to the pattern 330 of FIG. 10. The probe 10 is adapted to detect a portion of the pattern, for determining a location or an absolute position of the rod 12 relative to a housing of the cylinder. In the embodiment illustrated in FIG. 1, the probe 10 is fixed relative to a housing of the cylinder. The pattern on the rod 12 is formed from a series of codewords such that detecting any one or more code words provides an indication of the position of the rod relative to the housing of the cylinder. The probe 10, after detecting a portion of the pattern, outputs one or more signals indicative of the detected position of the rod 12.

In the exemplary embodiment of FIG. 1, the probe 10 includes a housing 16 formed by a lower casing 18 and an upper casing 20. In one embodiment, the housing 16 is a hermetic housing sealed with a sealing member 22. The lower casing 18 includes a hollow, cylindrical portion 24 that extends outwardly from a bottom surface 26 of the lower casing 18. The cylindrical portion 24 terminates at an annular end wall 28 that extends radially inwardly from a cylindrical side wall 30. The upper casing 20 is attachable to the lower casing 18. FIG. 1 illustrates through holes 34 in the upper casing 20 that align with threaded holes 36 in the lower casing 18 for receiving fasteners (not shown) to attach the upper and lower casings. When the upper and lower casings 20 and 18 are attached together, a cavity 38 is formed within the housing 16.

Figure 2:
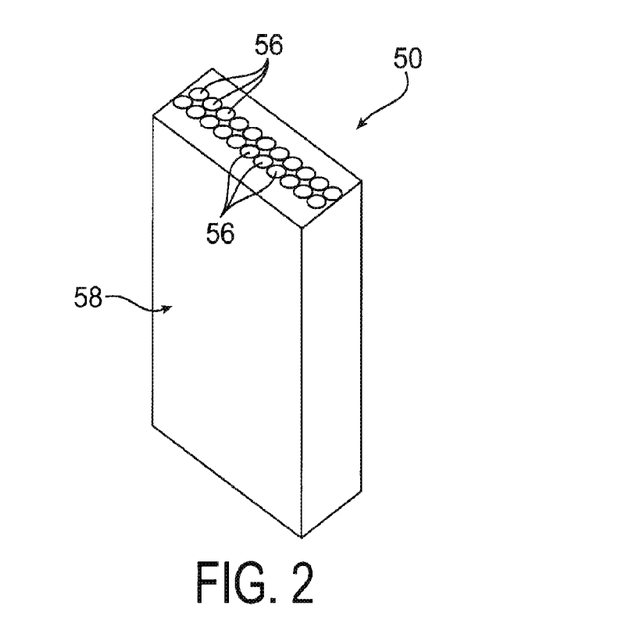
FIG. 2 is a perspective view of an exemplary lens of the probe of FIG. 1.

The probe 10 also includes a light source 44, a detector 46, a light pipe 48, and a lens 50. In the embodiment of FIG. 1, the light source 44 is a light emitting diode (LED) and the detector 46 is a charge-coupled device (CCD) having a linear pixel array. Those skilled in the art should recognize that alternative light sources and alternative detectors may be used. The light pipe 48 is elongated with an angled central portion 54. The light pipe 48 is used to transfer uneven illumination from the light source 44 in a linear and even fashion to the pattern on the outer surface of the rod 12. The light from the light pipe 48 illuminates a portion of the pattern. Using the light reflected off of the outer surface of the rod 12, the lens 50 produces an image of the illuminated portion of the pattern at the plane of the detector 46. The lens 50 in FIG. 1 is a gradient index lens, which is formed from a plurality of rods 56 arranged in an array. Hereafter, the lens 50 is referred to as a GRIN array. In one embodiment of the probe 10, the GRIN array 50 is formed by multiple rows of rods 56. FIG. 2 illustrates a GRIN array 50 formed by two rows of rods 56 supported in an outer sheathing 58. The image produced onto the detector 46 by the GRIN array 50 of FIG. 2 has a width that is significantly wider than a width (transverse to the linear direction) of the linear pixel array of the detector 46. This wide image allows for larger tolerances in the manufacture of the probe 10 resulting in a less costly, easier to manufacture probe. The GRIN array 50 is located at a first predetermined focal distance (distance x in FIG. 3) from the outer surface of the rod (i.e., from the pattern). The GRIN array 50 is placed at a second predetermined focal distance (distance y in FIG. 3) from the detector 46. The first and second predetermined focal distances x and y may be the same or different distances. In one embodiment of the invention, the focal distances x and y are chosen so as to provide a one-to-one image of the viewed pattern on the detector 46.

Figure 3:
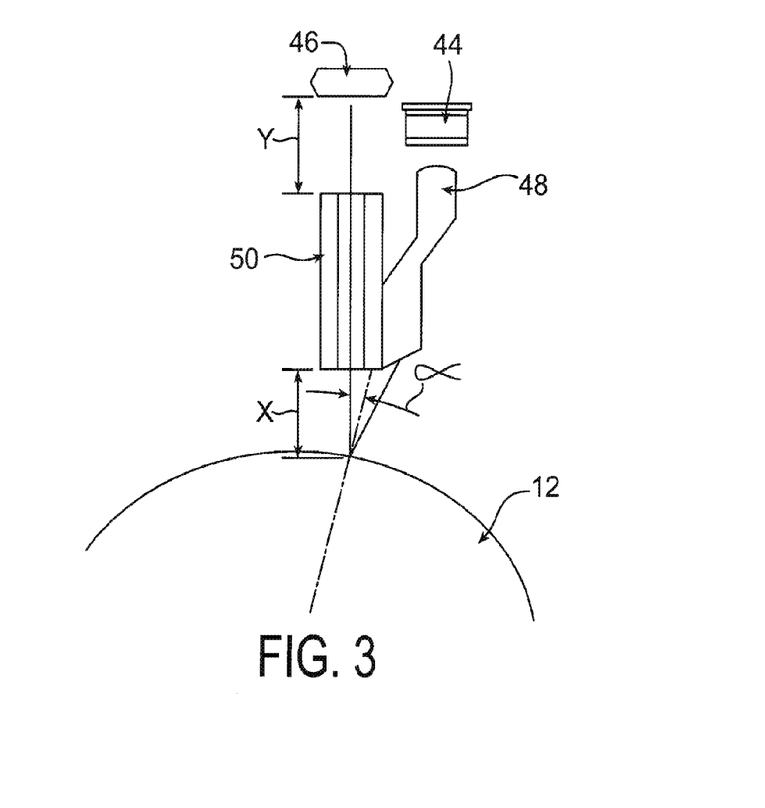
FIG. 3 illustrates an exemplary position of portions of the probe relative to the rod.

A cassette 64 supports the light source 44, the detector 46, the light pipe 48 and the GRIN array 50 within the cavity 38 of the housing 16. The cassette 64 may be molded from a thermoplastic material, such as a polycarbonate. The cassette 64 of FIG. 1 includes lower portion 66 having a widened top 68 and a generally cylindrical bottom 70 that is press fit within the cylindrical portion 24 of the lower casing 18 of the housing 16 to fix the cassette 64 relative to the housing 16. A cylindrical side surface 72 of the lower portion 66 of the cassette 64 includes an annular groove 74 for receiving an o-ring 76 for sealing between the cassette 64 and the housing 16. An annular support 80 extends outwardly of the bottom 70 of the lower portion 66 in a direction opposite the top 68. The annular support 80 is sized to extend through an opening in the end wall 28 of the lower casing 18 and includes diametrically opposite, axially extending slots 82. A passage 86 extends axially through the cassette 64. FIG. 1 illustrates shoulders 88 and 90 for supporting the GRIN array 50 and light pipe 48 in the passage 86 of the cassette 64. The GRIN array 50 and light pipe 48 are supported in a manner so that the light directed out of the light pipe is reflected into the GRIN array. In one embodiment of the invention, the angle α between a centerline of the GRIN array 50 and an imaginary plane passing through the center of the rod 12 is between 10 and 15 degrees, preferably between 11.5 and 12.5 degrees. FIG. 3 illustrates an angle α of 12.25 degrees between a centerline of the GRIN array 50 and an imaginary plane passing through the center of the rod 12. The angle α is dependent at least partially on the physical separation between the light source 44 and the detector 46.

The cassette 64 also includes an upper portion 90 that supports the light source 44 and the detector 46. The upper portion 90 illustrated in FIG. 1 rests atop the sheathing 58 of the GRIN array 50 and is affixed to the lower portion 66 of the cassette 64, such as by using an alignment pin 92 and associated hole (not shown). The upper portion 90 of the cassette 64 establishes the predetermined focal distance y between the GRIN array 50 and the detector 46.

The light source 44 and the detector 46 are mounted on a printed circuit board (PCB) 94 in a known manner. The PCB 94 also includes a controller 96, such as a microprocessor or application specific integrated circuit. The controller 96 is responsive to signals from the detector to determine a position of the rod 12 relative to the housing of the cylinder.

The probe 10 of FIG. 1 also includes a wiper 100. The wiper 100 is generally tubular in shape with an axially extending through passage 102. Two diametrically opposite bosses 104 extend radially outwardly from the wiper and are received in the slots 82 of the annular support 80 of the cassette 64 so that the wiper 100 may move axially relative to the cassette 64 over a short distance. A biasing member 106, such as a leaf spring, biases the wiper 100 relative to the cassette 64 and toward the rod 12. A bottom surface of the wiper 100 is curved to match the curvature of the outer surface of the rod 12. The wiper 100 is adapted to slide over the outer surface of the rod 12 during movement of the rod. In doing so, the wiper 100 helps to prevent contaminants from entering the optical field of the probe 10.

During operation of the probe 10 in detecting an absolute position of the rod 12 relative to the cylinder, light emitted from the light source 44 is received by the light pipe 48. The light pipe 48 directs the uneven illumination from the light source 44 in a linear and even fashion onto the portion of the pattern on the outer surface of the rod 12 located in the optical field of the probe 10. Using the light reflected off of the outer surface of the rod 12, the GRIN array 50 produces a focused image of the illuminated portion of the pattern at the plane of the detector 46. The detector 46 detects the portion of the pattern from the image and outputs a signal indicative of the sensed light to the controller 96. The controller 96 analyzes the received signal to determine the position of the rod 12 relative to the cylinder. In one embodiment, the controller 96 may access a lookup table stored in memory for determining the position of the rod 12.

Figure 4:
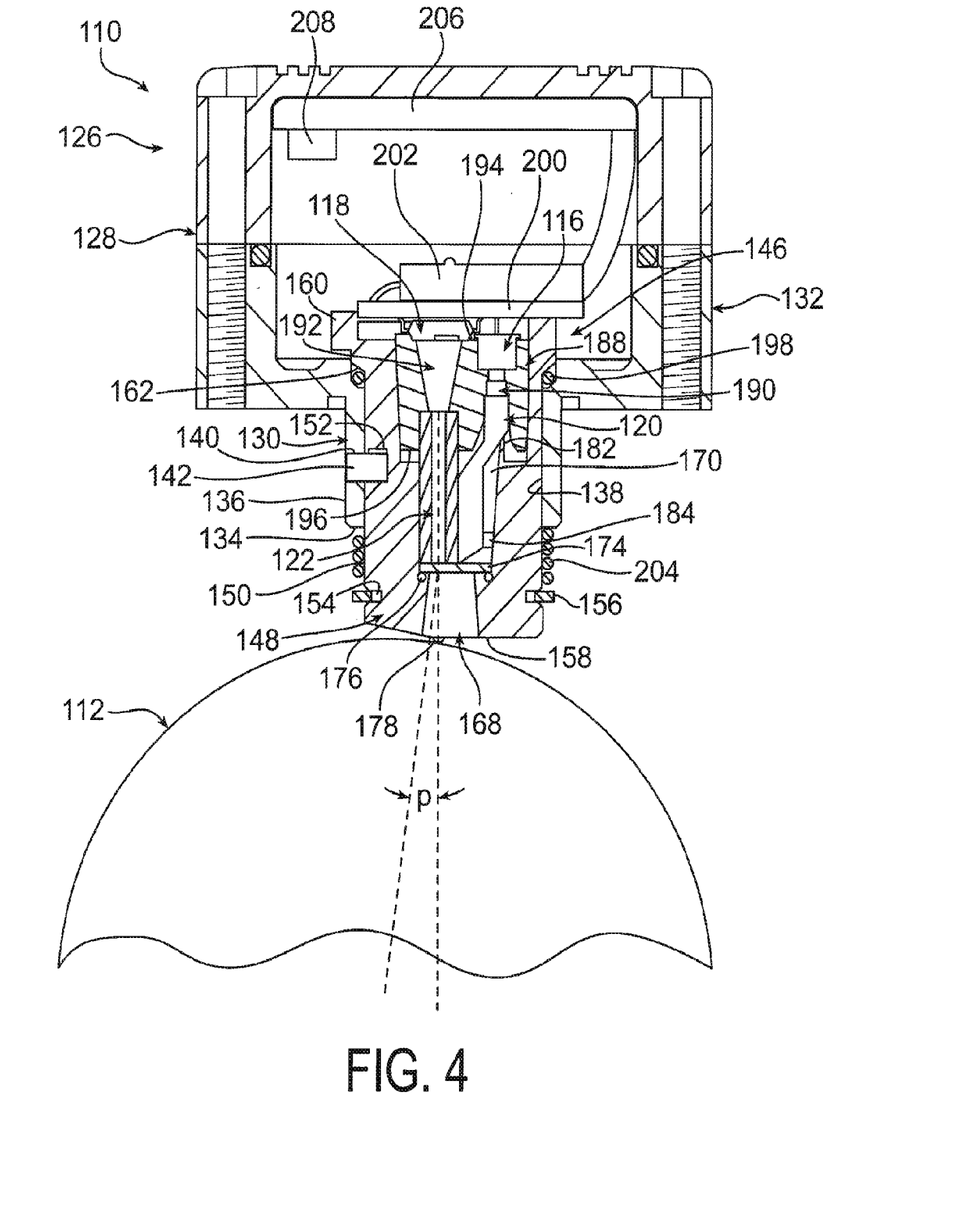
FIG. 4 illustrates a probe constructed in accordance with a second exemplary embodiment of the invention positioned adjacent a rod.

FIG. 4 illustrates a probe 110 constructed in accordance with a second exemplary embodiment of the invention positioned adjacent a rod 112. In the embodiment of FIG. 4, the optical components such as the light source 116, detector 118, light pipe 120 and GRIN array 122 remain the same as or similar to those described previously with reference to FIG. 1 and thus, will not be discussed in detail. The structures of the probe 110 of FIG. 4 for supporting the light source 116, the detector 118, the light pipe 120 and the GRIN array 122 differ from those described with reference to FIG. 1 and are discussed below.

The housing 126 of the probe 110 of FIG. 4 includes an upper casing 128 and a lower casing 132. The housing 126 of FIG. 4 differs from the housing 16 of FIG. 1 in that the hollow cylindrical portion 130 of the lower casing 132 of FIG. 4 does not include a radially inwardly extending end wall. Instead, the cylindrical portion 130 terminates at an annular end surface 134 that extends between a cylindrical outer surface 136 and cylindrical inner surface 138 of the cylindrical portion. A through hole 140 for receiving a locking pin 142 extends radially through the cylindrical portion 130 from the outer surface 136 to the inner surface 138.

The probe 110 of FIG. 4 also includes a two-piece cassette 146. A lower portion 148 of the cassette 146 is generally cup shaped and includes a cylindrical outer surface 150 sized for fitting snuggly within the cylindrical portion 130 of the lower casing 132. An axially extending slot 152 extends into the outer surface 150 of the lower portion 148. An annular groove 154 for receiving a lock ring 156 extends into the outer surface 150 near a bottom surface 158 of the lower portion 148. A radially outwardly extending lip 160 defines a top of the lower portion 148 of the cassette 146. An angled shoulder 162 connects the lip 160 and the outer surface 150 of the lower portion 148 of the cassette 146.

A passage 168 extends into the lower portion 148 of the cassette 146 from the bottom surface 158. A cavity 170 is located within the lower portion 148 of the cassette 146 and is open to the top of the lower portion. A window 174 formed from a transparent material separates the passage 168 and the cavity 170. The window 174 may be formed as an integral portion of the lower portion 148 of the cassette 146 or, alternatively, may be a separate structure. When formed as a separate structure as is illustrated in FIG. 4, a seal 176 may be used to seal between the window 174 and the lower portion 148 of the cassette 146.

The lower portion 148 of the cassette 146 also includes one or more locating protrusions. FIG. 4 illustrates one locating protrusion at 178. The locating protrusion 178 extends outwardly of the bottom surface 158 of the lower portion 148 from a location near the passage 168. The locating protrusion 178 is designed for contacting the rod 112 and riding along the outer surface of the rod during movement of the rod relative to the probe 110.

The lower portion 148 of the cassette 146 also includes support structures that extend into the cavity 170 for supporting and positioning the GRIN array 122 and the light pipe 120 relative to the window 174. In FIG. 4, the support structures include arm 182 and shoulder 184 for supporting the light pipe 120 in the cavity 170 and pressing the light pipe against the GRIN array 122.

The upper portion 188 of the cassette 146 is generally cylindrical and is sized to be received in the cavity 170 of the lower portion 148 of the cassette. The upper portion 188 of the cassette 146 includes two through holes 190 and 192 that extend axially from the upper surface 194 to the lower surface 196 of the upper portion 188. Through hole 190 includes a portion adjacent the upper surface 194 that is sized for receiving the light source 116 and a portion adjacent the lower surface 196 that is sized for receiving a portion of the light pipe 120. The through hole 190 between the portion receiving the light source 116 and the portion receiving the light pipe 120 is sized to direct a portion of the light emitted by the light source to the light pipe and to prevent the passage of another portion of the light emitted by the light source to the light pipe. Thus, through hole 190 acts as a controlled aperture for the light emitted by the light source 116. Similarly, through hole 192 includes a portion adjacent the upper surface 194 that is sized for receiving the detector 118 and a portion adjacent the lower surface 196 that is sized for receiving a portion of the GRIN array 122.

To assemble the cassette 146, the seal 176 and window 174 are inserted into the cavity 170 and located above the passage 168. A lock ring 156 is positioned in the annular groove 154 and a seal 198 is located adjacent the angled shoulder 162. The GRIN array 122 is placed in position above the window 174 and, the light pipe 120 is positioned above the window 174 and against the GRIN array 122. When positioned against the GRIN array 122, the light pipe 120 is supported by the arm 182 and shoulder 184. The upper portion 188 of the cassette 146 then is positioned in the cavity 170 of the lower portion 148 so that the light pipe 120 and GRIN array 122 are received in their associated through holes 190 and 192. The PCB 200 with the attached light source 116 and detector 118 is positioned relative on the upper portion 188 of the cassette 146 so that the light source 116 and the detector 118 are received in their associated through holes 190 and 192. The PCB 200 is connected by a cable 202 to another PCB 206 upon which the controller 208 is mounted. The PCB 206 is fixed to the upper casing 128 of the housing 126, such as by fasteners, clips, or any other know means. When the upper portion 188 of the cassette 146 is received in the lower portion 148 of the cassette, the light source 116, the light pipe 120, the GRIN array 122, and the detector 118 become optically aligned with one another and relative to the window 174.

When the cassette 146 is located within the lower casing 132 of the housing 126, the cylindrical outer surface 150 of the lower portion 148 of the cassette 146 is in close proximity to the inner surface 138 of the cylindrical portion 130 of the lower casing 132. A locking pin 142 is positioned to extend through the through hole 140 in the cylindrical portion 130 and into the slot 152 in the lower portion 148 of the cassette 146. The locking pin 142 enables slight axial movement of the cassette 146 relative to the cylindrical portion 130 and prevents rotation of the cassette 146 in the housing 126. A biasing member 204, such as a helical spring, is positioned between the lock ring 156 and the annular end surface 134 of the cylindrical portion 130 of the housing 126 for biasing the locating protrusion 178 against the rod 112.

In the embodiment of FIG. 4, the angle ρ between a centerline of the GRIN array 122 and an imaginary plane passing through the center of the rod 112 is between 10 and 15 degrees, preferably between 11.5 and 12.5 degrees. FIG. 4 illustrates the probe 110 being offset relative to a center of the rod 112 for providing this angle ρ. Although the angle ρ in FIG. 4 is illustrated differently than the angle α in FIG. 3, each angle is measured between a centerline of the GRIN array and an imaginary plane passing through the center of the rod.

Figure 5:
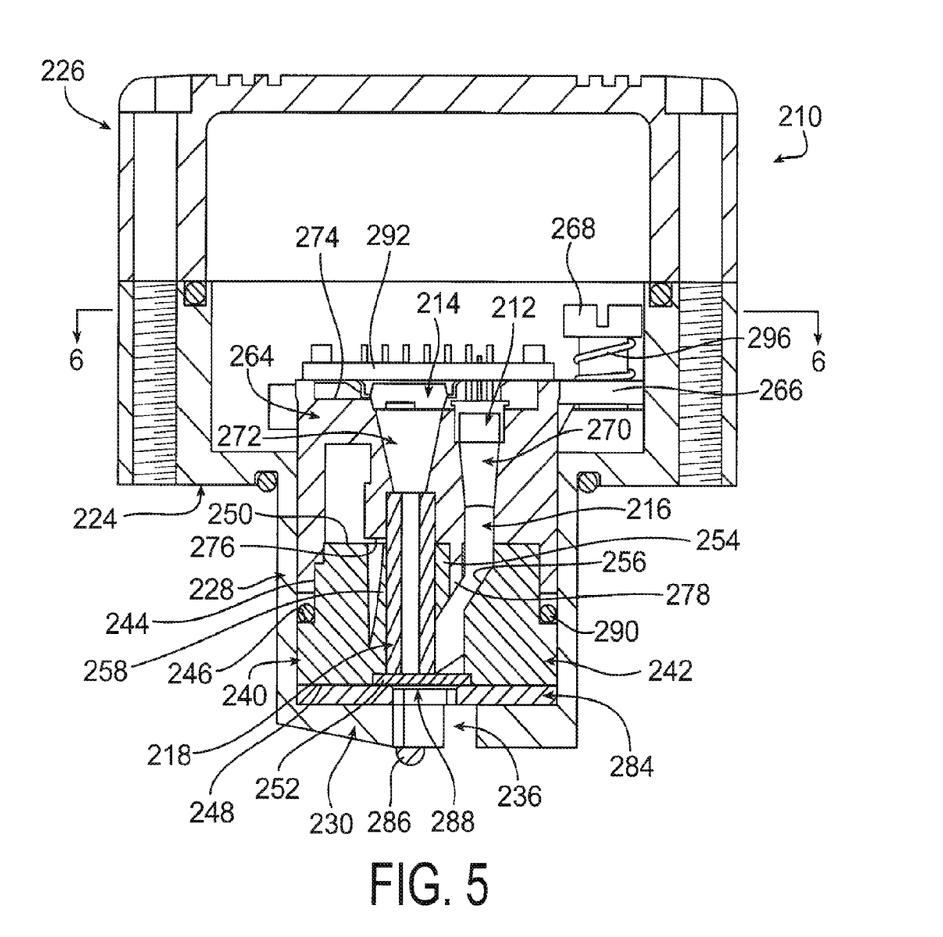
FIG. 5 illustrates a probe constructed in accordance with a third exemplary embodiment of the invention.

FIG. 5 illustrates a probe 210 constructed in accordance with a third exemplary embodiment of the invention. As with FIG. 4, the optical components such as the light source 212, the detector 214, the light pipe 216, and the GRIN array 218 remain the same or similar as those described with reference to FIG. 1 and, thus, will not be discussed in detail.

Figure 7:
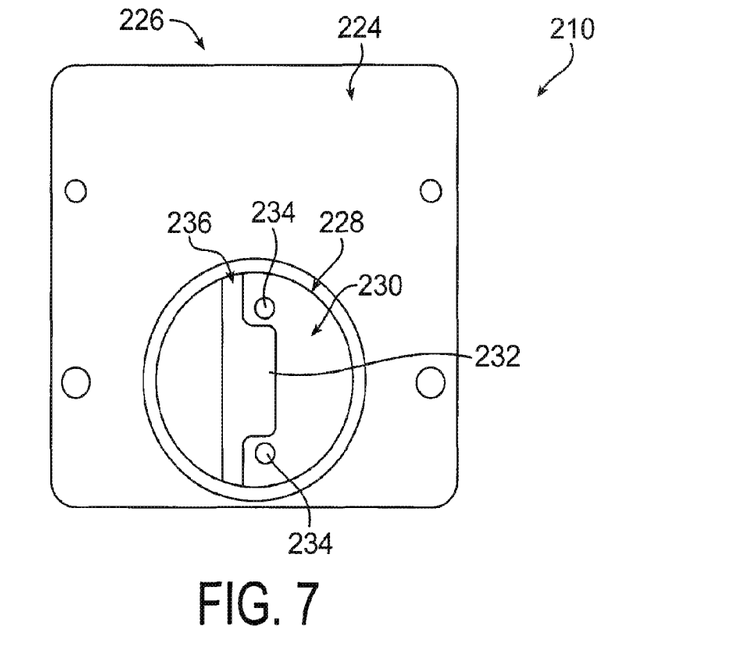
FIG. 7 is a bottom view of the probe of FIG. 5.

In the embodiment of FIG. 5, the lower casing 224 of the housing 226 of the probe 210 includes a generally cylindrical portion 228 with an end wall 230. As shown in FIG. 7, the end wall 230 is circular in shape. An opening 232 extends through the center of the end wall 230. The opening 232 in FIG. 7 is rectangular. Two through holes 234 extend through the end wall 230, one spaced a short distance from each end of the opening 232. A groove 236 extends through the end wall 230 immediately adjacent the opening 232, as shown in FIG. 7. The groove 236 enables the flow of fluid across the opening 232 to help remove contaminants or debris the opening 232.

The cassette 240 of the probe 210 of FIG. 5 is a two-piece unit. A lower portion 242 of the cassette 240 includes a stepped cylindrical outer surface 244 having a bottom with a diameter slightly larger than the top and separated by an annular shoulder 246. A passage extends from a bottom surface 248 to the top surface 250 of the lower portion 242 of the cassette 240. The passage includes a widened portion at the bottom surface 248 for receiving a window 252, formed from a transparent material, such as a clear plastic. The passage has a single opening on the bottom surface 248 and two openings on the top surface 250 separated by aligning shoulder 254. Adjacent the passage and integral with the lower portion of the cassette 240 are support structures for supporting the light pipe 216 and the GRIN array 218. The support structures include an angled shoulder 256 for supporting an angled portion of the light pipe 216, an elongated biasing member 258 for pressing against the GRIN array 218, and the aligning shoulder 254 for aligning adjacent surfaces of the light pipe 216 and the GRIN array 218.

Figure 6:
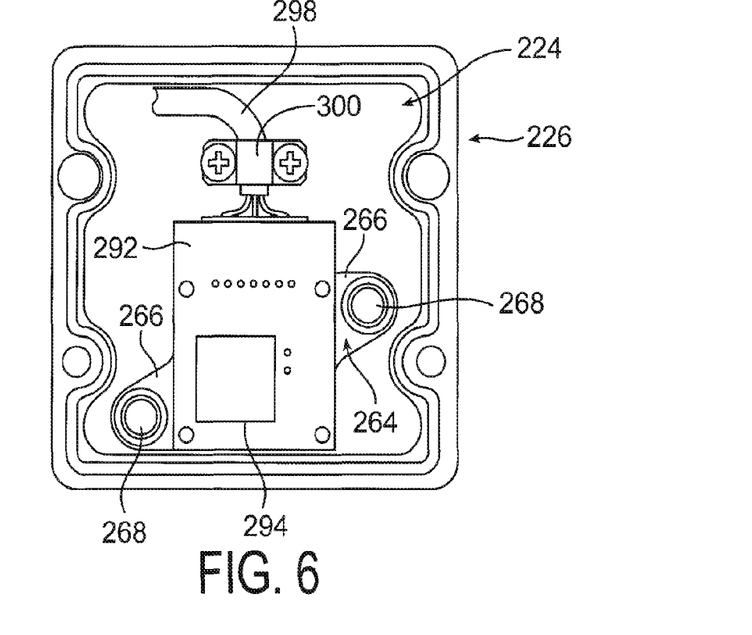
FIG. 6 is a view taken along line 6-6 of FIG. 5.

The upper portion 264 of the cassette 240 is generally cylindrical. A recess extends into the bottom of the upper portion 264 of the cassette 240 for receiving the top of the lower portion 242 of the cassette. The top of the upper portion 264 of the cassette 240 includes two outwardly extending ears 266, as shown in FIG. 6. The ears 266 each include a through hole (not shown) for receiving a fastener 268 for attaching the cassette 240 to the housing 226. As shown in FIG. 5, the upper portion 264 of the cassette 240 also includes two through holes 270 and 272 that extend from the upper surface 274 to the lower surface 276 of the upper portion. Through hole 270 includes a portion adjacent the upper surface 274 that is sized for receiving the light source 212 and a portion adjacent the lower surface 276 that is sized for receiving a portion of the light pipe 216. Through hole 270, in between the portion receiving the light source 212 and the portion receiving the light pipe 216, acts as a controlled aperture for the light emitted by the light source. Similarly, through hole 272 includes a portion adjacent the upper surface 274 that is sized for receiving the detector 214 and a portion adjacent the lower surface 276 that is sized for receiving a portion of the GRIN array 218. The upper portion 264 of the cassette 240 establishes a focal distance between the GRIN array 218 and the detector 214. A locating arm 278 extends downwardly from the lower surface 276 of the upper portion 264 in a location between the two through holes 270 and 272.

The probe 210 of FIG. 5 also includes a spacer member 284. The spacer member 284 is generally planar and includes two elongated protrusions, one of which is partially shown in FIG. 5 at 286. The elongated protrusions 286 are adapted to extend through and protrude from the two through holes 234 located in the end wall 230 of the lower casing 224 of the housing 226. A center of the spacer member 284 includes a window 288 that corresponds in size and location to the opening 232 in the end wall 230 of the lower portion 242 of the housing 226.

To assemble the cassette 240, the window 252 is inserted into the widened portion of the passage adjacent to the bottom surface 248 of the lower portion 242 of the cassette 240 and, a seal 290 is positioned about the smaller diameter top of the lower portion 242. The GRIN array 218 is positioned in the passage of the lower portion 242 such that the elongated biasing member 258 presses the GRIN array 218 against the aligning shoulder 254. The light pipe 216 is positioned against both the aligning shoulder 254 and the angled shoulder 256. The upper portion 264 of the cassette 240 is positioned over the lower portion 242 of the cassette so that the light pipe 216 and GRIN array 218 are received in their associated through holes 270 and 272. When the upper portion 264 of the cassette 240 is positioned atop and receives the lower portion 242, the locating arm 278 of the upper portion 264 presses against the light pipe 216 to secure the light pipe in a proper position within the cassette 240. The PCB 292 with the attached light source 212, detector 214, and controller 294 (FIG. 6) is positioned on the upper portion 264 of the cassette 240 so that the light source 212 and the detector 214 are received in their associated through holes 270 and 272. When the cassette 240 is assembled, the light source 212, the light pipe 216, the GRIN array 218, and the detector 214 become optically aligned with one another and relative to the opening 232.

To assemble the probe 210, the spacer member 284 is inserted into the cylindrical portion 228 of the lower casing 224 of the housing 226 so that the two elongated protrusions 286 extend through and protrude from the through 234 holes located in the end wall 230 of the lower portion 242. The assembled cassette 240 is positioned within the lower casing 224 of the housing 226 above the spacer member 284. When the cassette 240 is positioned within the lower casing 224, the through holes in the ears 266 align with threaded holes (not shown) in the lower casing 224 of the housing 226. Fasteners 268 having associated biasing members 296, as shown in FIG. 5, pass through the through holes in the ears 266 and are threaded into the lower casing 224 of the housing 226. The biasing members 296 associated with the fasteners 268 act between the head of the fastener and the cassette 240 for allowing slight movement of the cassette relative to the housing 226. During use of the probe 210, the elongated protrusions 286 of the spacer member 284 contact the surface of the rod to establish the focal distance between the optical components in the cassette 240 and the rod. The biasing members 296 associated with the fasteners 268 enable slight movement of the cassette 240 relative to the housing 226 in response to contours or imperfections on the rod acting against the elongated protrusions 286.

FIG. 6 also illustrates a cable 298 for providing power to the probe 210 and for transferring signals to and from the probe. The cable 298 is held relative to the lower casing 224 of the housing 226 with a cable retainer 300.

Figure 8:
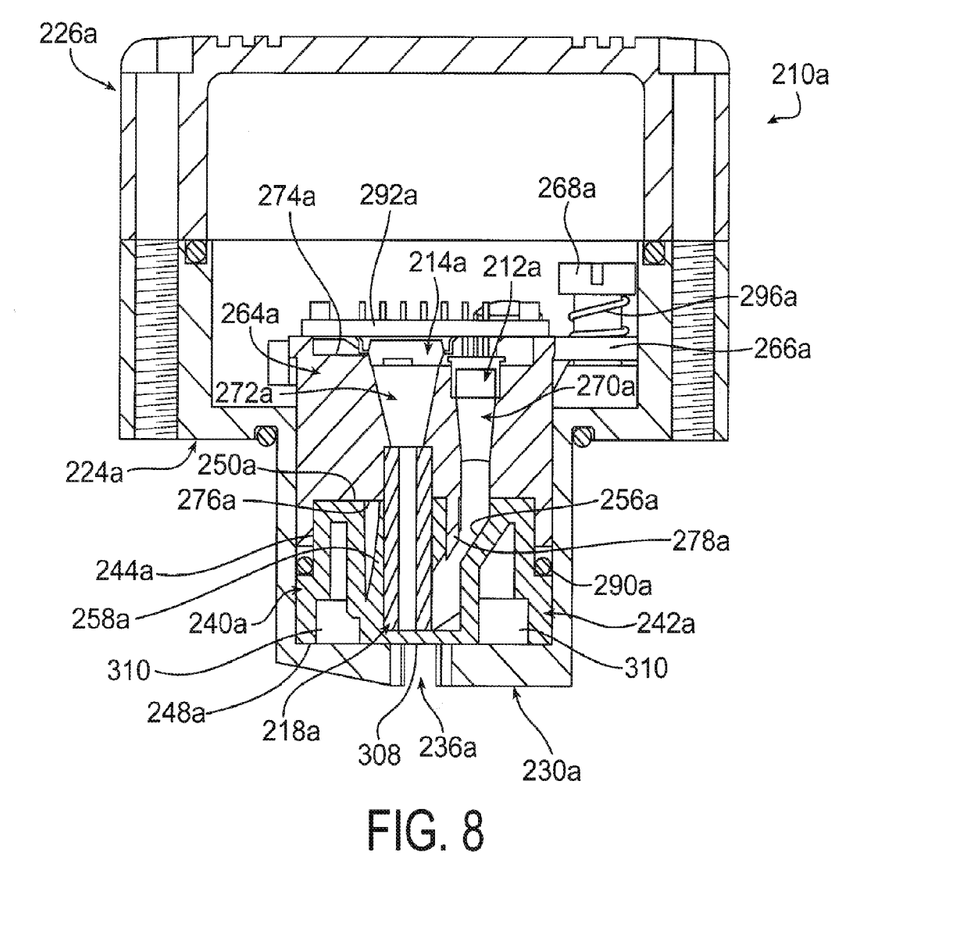
FIG. 8 illustrates a probe constructed in accordance with yet another exemplary embodiment of the invention.
Figure 9:
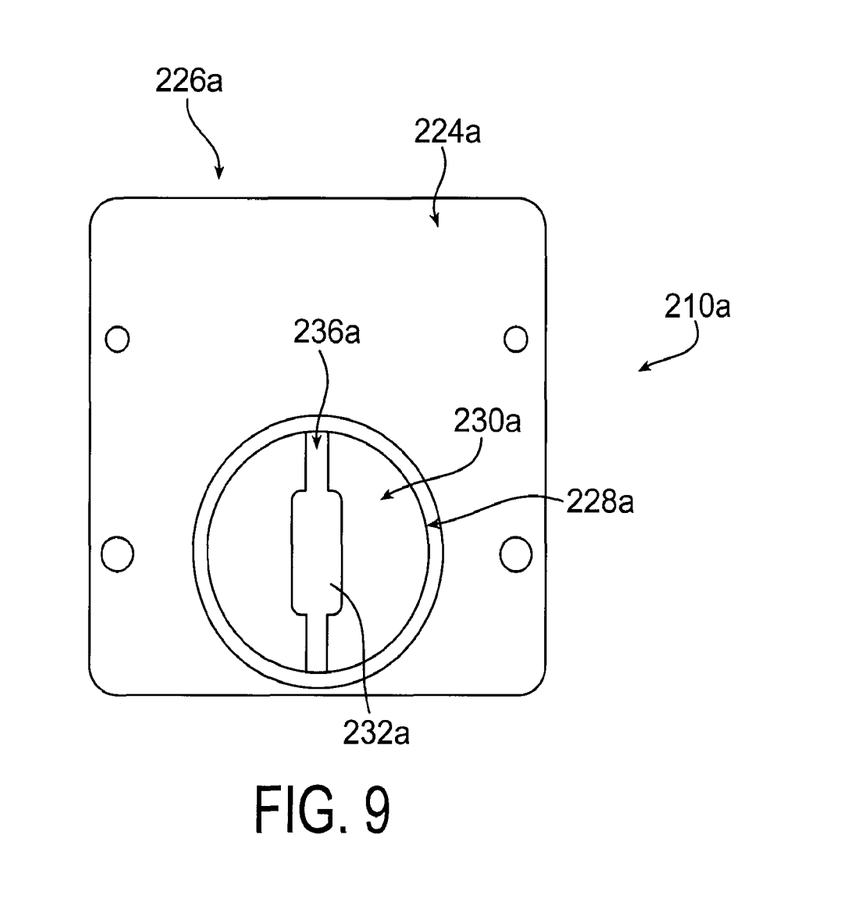
FIG. 9 is a bottom view of the probe of FIG. 8.

FIGS. 8 and 9 illustrate a probe 210a constructed in accordance with yet another exemplary embodiment of the invention. As the embodiment of FIGS. 8 and 9 is similar to that described with reference to FIGS. 5-7, only the structures of FIGS. 8 and 9 that differ substantially from those previously described with be discussed in detail. Additionally, structures of the probe 210a of FIGS. 8 and 9 that are the same as or similar to those of the probe 210 of FIGS. 5-7 are labeled with the same reference numbers with the addition of the suffix "a".

With reference to FIG. 9, the lower casing 224a of the housing 226a is modified slightly such that the groove 236a passes directly through the opening 232a of the end wall 230a. This alignment of the groove 236a and the opening 232a ensure more even fluid flow across all portions of the opening 232a.

Also, the lower portion 224a of the cassette 240a is formed with an integral window 308, as shown in FIG. 8. The lower portion 224a is formed from a transparent material, such as a clear polycarbonate material. Further, cavities 310 are formed in the lower portion 224a to enable the lower portion to be molded as one piece. When the lower portion 224a is formed from a transparent material, care must be taken not to interfere with the light traveling through the light pipe 216a. Thus, the angle of the angled shoulder 256a of the lower portion 224a may differ slightly from the angle of the light pipe 216a so that there is minimal contact between the light pipe and the angled shoulder.

The probe 210a of FIG. 8 is designed to remain spaced away from the rod during use. Thus, unlike the probe 210 of FIG. 5, the probe of FIG. 8 does not include any features, such as the protrusions 286, to contact the rod or the through holes 234 in the end wall 230 of the cylindrical portion 228 of the housing 226. As a result, the probe 210a of FIG. 8 does not include a spacer member similar to spacer member 284 of FIG. 5.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:
1. A probe for determining an absolute position of a rod relative to a cylinder, the rod having an associated pattern for indicating position, the probe comprising:
a light source for emitting light;
a light pipe for directing light emitted by the light source onto the pattern of the rod;
a detector for detecting light and for providing a signal indicative of the detected light;
a gradient index lens for producing an image of a portion of the pattern illuminated by the light on the detector, the detector detecting the image and providing a signal indicative of the detected image, and a cassette for establishing a focal distance between at least the detector and the lens, and a controller responsive to the signal from the detector for determining an absolute position of the rod relative to the cylinder.

2. The probe of claim 1 wherein the lens is formed from a plurality of rods arranged in an array.

3. The probe of claim 2 wherein the array is formed by multiple rows of rods supported in an outer sheathing.

4. The probe of claim 1 wherein the cassette is received in a housing and is fixed relative to the housing.

5. The probe of claim 4 wherein the cassette supports a wiper that is adapted to engage the rod, the wiper being movable relative to the cassette, a biasing member biasing the wiper into engagement with the rod.

6. The probe of claim 1 wherein the cassette is received in a housing and is axially movable relative to the housing, a biasing member acting to bias the cassette toward the rod.

7. The probe of claim 6 wherein a groove is formed in an outer surface of the cassette, a lock ring is received in the groove, a biasing member acting between the housing and the lock ring to bias the cassette toward the rod.

8. The probe of claim 6 wherein the cassette includes at least one ear, a fastener extending through the ear and engaging the housing, a biasing member acting between the ear and the fastener to bias the cassette toward the rod.

9. The probe of claim 6 further including a protrusion that is adapted to engage the rod, the protrusion establishing a focal distance between the pattern and the lens.

10. The probe of claim 9 wherein the protrusion is formed as an integral portion of the cassette.

11. The probe of claim 1 further including a window, the window being interposed between the pattern and the light pipe and between the pattern and the lens, light passes through the window when travelling from the light pipe to the pattern and when travelling from the pattern to the lens.

12. The probe of claim 11 wherein the window is an integral portion of the cassette.

13. The probe of claim 1 wherein the cassette includes a lower portion and an upper portion, the lower portion configured for receiving the light pipe and the lens, the upper portion fitting together with the lower portion and supporting at least the light source and the detector.

14. The probe of claim 13 wherein the upper portion of the cassette engages at least a portion of the lens for establishing a focal distance between the lens and the detector.

15. The probe of claim 13 wherein the upper portion of the cassette includes first and second through holes, a portion of the first through hole adapted to receive a portion of the lens and a portion of the second through hole adapted to receive a portion of the light pipe.

16. The probe of claim 15 wherein another portion of the first through hole is adapted to receive the detector and another portion of the second through hole is adapted to receive the light source.

17. The probe of claim 1 further including a housing having a cavity in which the light source, the light pipe, the detector and the lens are located, an opening located in an end wall of the housing, light emitted by the light source exiting the housing through the opening and light reflected off of the pattern entering the housing through the opening.

18. The probe of claim 17 further including a groove that extends across the end wall of the housing and intersects with at least a portion of the opening in the housing, the groove providing a path for fluid to and from the opening for helping to reduce a build up of contaminants in the opening.

* * * * *